(12) United States Patent
Hahn et al.

(10) Patent No.: US 7,063,790 B2
(45) Date of Patent: Jun. 20, 2006

(54) FILTER CANDLE

(75) Inventors: Adolf Hahn, Waidhaus (DE); Friedrich Banke, Inning am Holz (DE); Rudolf Flossmann, Langenbach (DE); Harald Gratzer, Berglern (DE)

(73) Assignee: Anton Steinecker Maschinenfabrik GmbH, Freising/Attaching (DE)

( * ) Notice: Subject to any disclaimer, the term of this patent is extended or adjusted under 35 U.S.C. 154(b) by 376 days.

(21) Appl. No.: 10/470,035

(22) PCT Filed: Mar. 15, 2002

(86) PCT No.: PCT/EP02/02914

§ 371 (c)(1),
(2), (4) Date: Jul. 24, 2003

(87) PCT Pub. No.: WO02/074412

PCT Pub. Date: Sep. 26, 2002

(65) Prior Publication Data

US 2004/0094038 A1 May 20, 2004

(30) Foreign Application Priority Data

Mar. 19, 2001 (EP) .................................. 01106844

(51) Int. Cl.
*B01D 29/33* (2006.01)

(52) U.S. Cl. .................. 210/323.2; 210/497.1
(58) Field of Classification Search ............. 210/323.2, 210/497.1, 499; 166/231–233; 29/896.61
See application file for complete search history.

(56) References Cited

U.S. PATENT DOCUMENTS

| 420,136 | A | * | 1/1890 | Willis | ........................ 210/323.2 |
| 806,416 | A | * | 12/1905 | Lanye | ........................ 166/231 |
| 2,084,433 | A | * | 6/1937 | Chorlton | ........................ 210/437 |
| 3,584,685 | A | * | 6/1971 | Boyd | ........................ 166/231 |
| 3,630,379 | A | * | 12/1971 | Sharples | ........................ 210/369 |
| 3,667,615 | A | | 6/1972 | Likness | |
| 2003/0052066 | A1 | * | 3/2003 | Spiller | ........................ 210/791 |

FOREIGN PATENT DOCUMENTS

| DE | 2241063 A1 | 2/1974 |
| EP | 0567726 A1 | 11/1993 |
| WO | WO 93/07944 A1 | 4/1993 |

* cited by examiner

*Primary Examiner*—David Sorkin
(74) *Attorney, Agent, or Firm*—Marshall, Gerstein & Borun LLP

(57) ABSTRACT

A filter candle for a precoated filter for filtering and/or stabilizing fluids, especially beer, the filter candle comprising a tubular filter body that is formed from a spirally wound wire, with gaps being provided between the wire windings as fluid passages. To improve the adhesion of the precoated filter in such a filter candle, the surface of the wound wire that rests against the exterior of the filter body is inclined by an angle α relative to the longitudinal axis of the filter candle.

7 Claims, 3 Drawing Sheets

FILTER CANDLE

FIELD OF THE INVENTION

The present invention relates to a filter candle for a precoated filter for filtering and/or stabilizing fluids, especially beer, the filter candle comprising a tubular filter body formed from a spirally wound wire, with gaps being provided between the wire windings as fluid passages.

BACKGROUND OF THE INVENTION

Precoated filters are especially needed in beer brewing to filter out the turbid matter contained in the beer and/or to stabilize the beer. In a known precoated filter, filter candles are used, in which the filter body comprises a wound wire, with gaps between the wire windings serving as fluid passages. The wound wire is either self-supported, or it is held by a carrier communicating with the wound wire. The filter candles of the precoated filter are arranged in an unfiltrate chamber, then passing the filtrate onwards into a filtrate area. For filtration, filtering aids, such as kieselguhr (diatomaceous earth), cellulose, pearlite, activated carbon, plastic fibers, glass fibers, cellulose fibers, or the like, are added to the beer to be filtered. During filtration the filtering aids are precoated on the exterior of the filter body at the beginning of the filtering operation, resulting in the formation of a precoat layer which, in turn, serves as a filtering layer.

The adhesion of the precoat layer to the filter body surface is of great importance, especially to process reliability, because a slipping off may lead to a destruction of the filter cake structure and thus also to an inadequate filter quality. The known filter bodies of wound wire, however, do not always yield an optimum adhesion of the filtering aid to the filter body, so that there may be malfunctions.

SUMMARY OF THE INVENTION

It is therefore the object of the present invention to provide a filter candle for filtering fluids, the filter candle permitting improved adhesion of the precoat layer.

According to the invention said object is achieved in that the surface of the wound wire that rests against the exterior of the filter body is inclined by an angle $\alpha$ relative to the longitudinal axis L of the filter candle.

Due to the inclination of the surface of the wound wire that rests against the exterior of the filter body, there is an offset of the surfaces of successive windings, so that the precoat layer can adhere in an improved manner. Despite said improved adhesion, there is also an improved back-washing possibility of the precoat layer because the risk of blocking is smaller thanks to the inventive arrangement of the wound wire.

The same advantages are also achieved during the separate or simultaneous stabilization of beer with stabilizing agents, such as polyvinylpolypyrrolidone (PVPP) or filtering aids, such as silica gels, because the adhesive power thereof is particularly critical.

The angle $\alpha$ is preferably within a range between 1° and 10°, preferably between 3° and 5°. In this range the inclined winding of the wire can be realized in a simple way, entailing a distinct improvement of the adhesion of the precoat layer.

Preferably, the wire has a substantially triangular, inwardly tapering cross-section, so that the baseline of the triangle rests on the exterior of the filter body. This yields a gap width that increases from the exterior of the filter body to the interior.

Advantageously, the upper edge and the lower edge of the inclined surface of the wound wire are rounded, which may already be due to manufacture. The rounded edges can reduce the risk of blocking even further during back-washing of the filter.

In a filter candle developed according to the invention, the lower edge of the inclined surface of a first winding relative to an upper edge of the inclined surface of a wire winding positioned thereunder is offset inwards, the radial offset thereinbetween being in the order of tenths of a mm. Preferably, all lower edges of the inclined surfaces are positioned along a straight line parallel to the longitudinal axis L of the filter body, and all upper edges of the inclined surface along a second straight line parallel to the longitudinal axis L of the filter body. This arrangement makes it possible that the precoat material, such as kieselguhr, can easily deposit between the mutually offset lower and upper edges of the successive inclined surfaces.

The present invention also relates to a precoated filter which comprises a filter vessel with an unfiltrate chamber, with filter candles being arranged in the unfiltrate chamber for filtering fluids.

BRIEF DESCRIPTION OF THE DRAWINGS

The invention shall now be explained with reference to the following figures in more detail, in which.

DETAILED DESCRIPTION OF THE INVENTION

Figure 4:
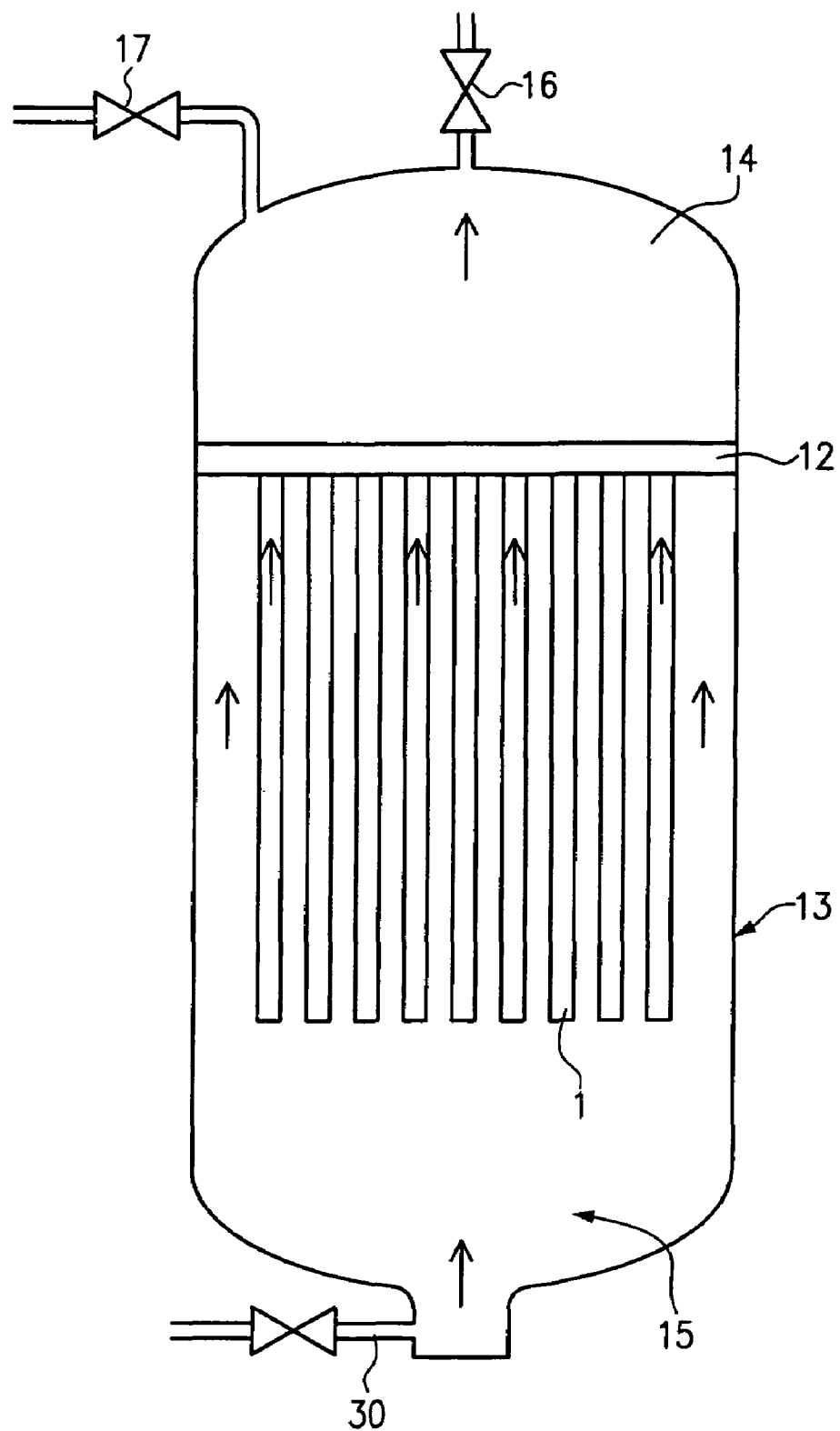
FIG. 4 is a schematic section through a precoated filter comprising the filter candles according to the invention.

As becomes apparent from FIG. 4, the filter candles according to the invention for filtering fluids, particularly beer, can be suspended in an unfiltrate chamber 15 of a filter vessel 13. In this instance, the filter candles are secured to a partition wall 12 which subdivides the filter vessel 13 into a filtrate chamber 14 and the unfiltrate chamber 15. The fluid to be filtered, such as beer, to which kieselguhr has been added as a filtering aid, is introduced via the inlet 30 into the unfiltrate chamber of the filter vessel 13. From said place it passes through the precoat layer, which has formed before and during filtration by kieselguhr depositing on the exterior surface of the filter candles, and then passes through the fluid inlets 12 (FIG. 2), which are formed by gaps between the wire windings 17, into the interior of the filter candle and is finally passed into the filtrate chamber 14 from where it then exists via an outlet 16 out of the filter vessel.

Figure 1A:
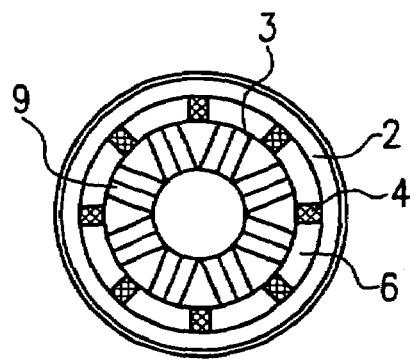
FIG. 1A shows a section along line A—A of FIG. 1.
Figure 1:
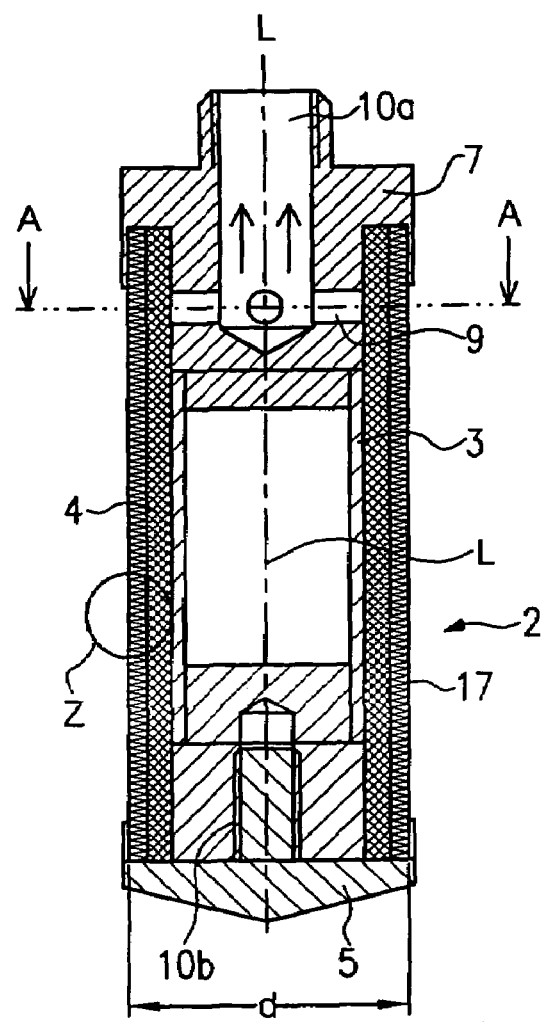
FIG. 1 schematically shows a longitudinal section through an embodiment of the filter candle according to the invention.

As becomes apparent from FIG. 1, the filter candle 1 in this embodiment comprises a filter body 2 which is formed from a spirally wound wire 17. The filter body is connected via spacers 4 to an inner body, here an inner tube 3, which serves to reduce the volume of the interior of the filter body 2. The wound wire 17 is thus held and supported by the inner tube with the spacers 4. The inner tube 3, the spacers 4 and the wound wire 17 form filtrate channels 6 (FIG. 1a) through which the filtrate can flow through the filter candle upwards to the recesses 9 and from there via the head portion 7 into the filtrate area 14. The filter body 2 is closed by a head portion 7 and an end portion 5. The invention, however, is not limited to said embodiment; of course, the wire wound according to the invention may also be self-supporting, e.g. due to welded support wires in axial direction, or it may comprise a different carrier construction.

Figure 2:
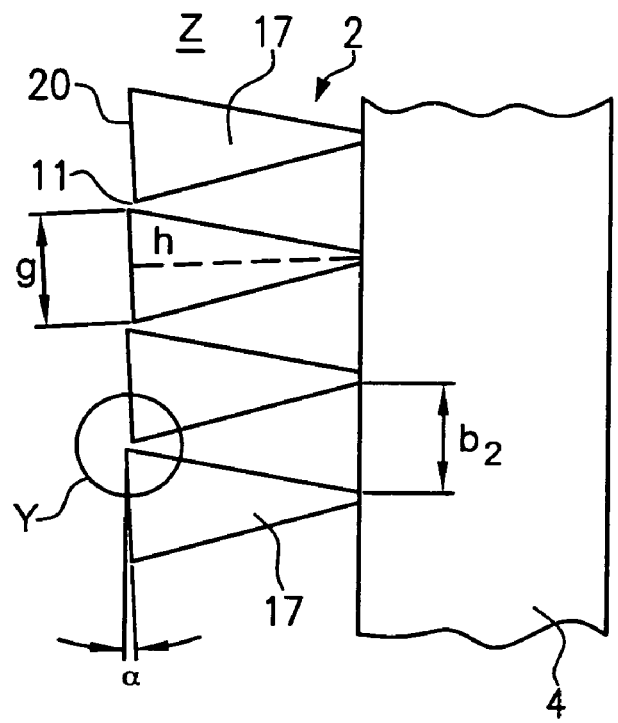
FIG. 2 shows an enlarged section Z of FIG. 1.

FIG. 2 shows, on an enlarged scale, area Z of FIG. 1. As follows from said FIG. 2, the spirally wound wire 17, which is here welded to the spacer element 4, which extends in the form of a rod in the longitudinal direction of the filter body 2, has a substantially triangular cross-sectional shape. The baseline g of the acute triangle is positioned on the exterior of the filter body 2. The baseline g has preferably a length between 0.5 to 3 mm. Height h of the acute triangle is from 1 to 5 mm. The surface 20 of the wound wire 17, which forms the exterior of the filter body 2 (baseline g), is inclined at an angle α relative to the longitudinal axis L of the filter candle. In this embodiment, said angle α is about 3°. The inclined surface 20 may either be achieved by an inclined winding of the wire 17 or by choosing the cross-section of the wire 17 such that the cross-section of the triangle is not an acute isosceles triangle, but an acute non-isosceles triangle, resulting also in the inclined position of the surface. The lower edge 21 of the inclined surface 20 of a first wire winding is offset inwards relative to the upper edge 22 of the inclined surface 20 of a wire winding positioned thereunder. The offset r (FIG. 3) is identical with the distance between a first plane imagined along the inclined surface 20 of a first winding, to a second plane extending along the inclined surface 20 of a successive winding. The radial offset r is between about 0.5 to about 2 mm. Thanks to the offset of the lower edge 21 relative to the upper edge 22, the upper edge 22 projects to the outside relative to the lower edge positioned thereabove, so that filtering aids can here very easily deposit as a precoat layer and can get fixed and secured against slipping downwards. All of the lower edges 21 of the inclined surface 20 are positioned along a straight line parallel to the longitudinal axis L of the filter body, and all of the upper edges 22 of the inclined surfaces 20 are along a second straight line parallel to the longitudinal axis L. Hence, the filter body 2 has a constant diameter over its whole length L.

Figure 3:
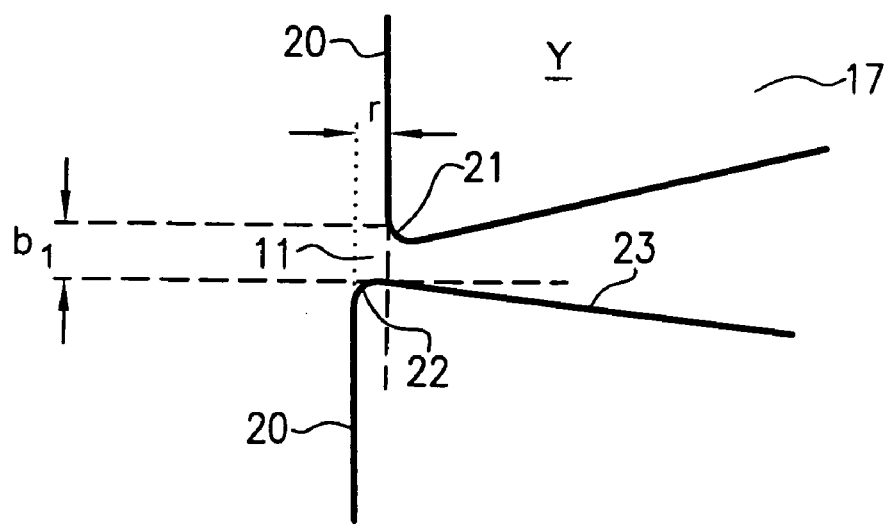
FIG. 3 shows an enlarged section Y of FIG. 2.

As follows from FIG. 3, the lower edge 21 and the upper edge 2 are rounded. This is of advantage because the risk of blocking is thereby reduced further.

The fluid passages are formed by the gaps 11 between the respective wire windings. The gap width between the lower edge 21 of a first wire winding and the surface 23 of the wire of the neighboring winding b1 facing the lower edge 21 is preferably between 5–8/100 mm when a beer filter is used, the perpendicular of the base g of a winding to the upper surface 23 of the neighboring winding being regarded as distance b1, as follows from FIG. 3. The gap width increases towards the interior of the filter body 2 due to the triangular cross-section of the wire.

In the illustrated embodiment, the upper edge of the wound wire is positioned relative to the filter body axis further to the outside than the lower edge of the wire. The present invention, however, should not be limited thereto because it is also possible, though not explicitly shown, that the lower edge of the wound wire is positioned further to the outside relative to the longitudinal axis L of the filter body 2 in comparison with the upper edge, i.e. the inclination is opposite to the inclination shown in the figures. In this instance, too, the irregular surface permits an improved deposition of the precoat layer, resulting, in addition, in a simplified back-washing.

The invention claim is:

1. A filter candle (1) for a precoated filter for filtering and/or stabilizing fluids, comprising:
    a tubular filter body (2) formed from a spirally wound wire (17) and having gaps provided between the wire windings as fluid passages,
    the surface (20) of the wound wire (17) that is the exterior of the filter body (2) being inclined by an angle α relative to the longitudinal axis (L) of the filter candle (1), and
    the wire (17) having a substantially triangular, inwardly tapering cross-section, with the baseline (f) of the triangle being the exterior of the filter body (2), thereby resulting in an offset of the surface (20) of successive wire windings.

2. The filter candle according to claim 1, wherein the angle α is within a range between 1° and 10°.

3. The filter candle according to claim 2, wherein the angle α is within a range of between 3° and 5°.

4. The filter candle according to claim 1, wherein the upper edge (22) and the lower edge (21) of the inclined surface (20) of the wound wire (17) are rounded.

5. The filter candle according to claim 1, wherein the radial offset (r) between an upper edge of the inclined surface of a first wire winding and the lower edge (21) of the inclined surface of a subsequent wire winding is between 1/10 mm and 1 mm.

6. The filter candle according to claim 1, wherein the wire consists of a corrosion-resistant, food-compatible material.

7. A precoated filter for filtering and/or stabilizing fluids, comprising:
    a filter vessel (13) including an unfiltrate chamber (15) in which filter candles are arranged for filtering fluids, each filter candle having a tubular filter body (2) formed from a spirally wound wire (17), and having gaps (11) provided between the wire windings as fluid passages, the surface (20) of the wound wire (17) that is the exterior of the filter body (2) being inclined by an angle α relative to the longitudinal axis (L) of the filter candle (1), and the wire (17) having a substantially triangular, inwardly-tapering cross-section, with the baseline (f) of the triangle being the exterior of the filter body (2), thereby resulting in an offset of the surfaces (20) of successive wire windings.

* * * * *